United States Patent
Beddis et al.

(10) Patent No.: US 10,769,725 B1
(45) Date of Patent: Sep. 8, 2020

(54) SYSTEM AND METHODS FOR OPTIMIZING THE EFFECTIVENESS OF INTERACTION BETWEEN PARTICIPANTS IN AN ELECTRONIC TRADING ENVIRONMENT

(71) Applicant: BIDS Trading, L.P., New York, NY (US)

(72) Inventors: Mark Beddis, West Vancouver (CA); Jim Lee, Bloomfield, NJ (US); Sik Ngai, Calgary (CA); Tim Mahoney, Westfield, NJ (US)

(73) Assignee: Bids Trading, L.P., New York, NY (US)

( * ) Notice: Subject to any disclaimer, the term of this patent is extended or adjusted under 35 U.S.C. 154(b) by 131 days.

(21) Appl. No.: 14/296,757

(22) Filed: Jun. 5, 2014

Related U.S. Application Data (60) Provisional application No. 61/831,541, filed on Jun. 5, 2013.

(51) Int. Cl.
*G06Q 40/04* (2012.01)

(52) U.S. Cl.
CPC .................... *G06Q 40/04* (2013.01)

(58) Field of Classification Search
None
See application file for complete search history.

(56) References Cited

U.S. PATENT DOCUMENTS

| | | | |
|---|---|---|---|
| 3,573,747 A * | 4/1971 | Adams | H04L 12/1804 705/37 |
| 4,412,287 A | 10/1983 | Braddock, III | |
| 5,077,665 A | 12/1991 | Silverman et al. | |
| 5,136,501 A * | 8/1992 | Silverman | G06Q 40/025 705/37 |
| 5,195,031 A | 3/1993 | Ordish | |
| 5,375,055 A | 12/1994 | Togher et al. | |

(Continued)

FOREIGN PATENT DOCUMENTS

| | | |
|---|---|---|
| CA | 2197768 A1 | 2/1996 |
| CA | 2338145 A1 | 11/2000 |

(Continued)

OTHER PUBLICATIONS

International Application No. PCT/US2008/052723, International Search Report, 1 page, dated May 21, 2008.

*Primary Examiner* — William J Jacob
(74) *Attorney, Agent, or Firm* — Perkins Coie LLP (57) ABSTRACT

The system and methods for optimizing the effectiveness of interaction between participants in an electronic trading environment are disclosed. In one embodiment, the system monitors and tracks certain variables at several levels (e.g., firm, trader, trade desk, symbol, side, order type) for each participant in the system, updates the values of the variables in real time and/or over longer periods. From the values of the variables, the system assigns individual and composite scores to each trader, symbol or side or any composite of these and other variables. For every interaction in the trading environment, the scores and variables are used to determine how a trader interacts with a contra trader when their respective scores are compared, including determining permissioning and timing of sending invitations to trade, permissioning and timing of receiving invitations to trade and/or execution of the trade.

19 Claims, 4 Drawing Sheets

(56) References Cited

U.S. PATENT DOCUMENTS

| | | | |
|---|---|---|---|
| 5,727,165 A * | 3/1998 | Ordish | G06Q 40/04 705/37 |
| 5,732,400 A * | 3/1998 | Mandler | G06Q 20/02 705/26.44 |
| 5,924,082 A * | 7/1999 | Silverman | G06Q 40/00 705/35 |
| 6,131,087 A * | 10/2000 | Luke | G06Q 30/06 705/26.41 |
| 6,311,178 B1 * | 10/2001 | Bi | G06F 17/3053 705/37 |
| 6,332,135 B1 | 12/2001 | Conklin et al. | |
| 6,336,105 B1 | 1/2002 | Conklin et al. | |
| 6,338,050 B1 | 1/2002 | Conklin et al. | |
| 6,418,419 B1 | 7/2002 | Nieboer et al. | |
| 6,496,851 B1 * | 12/2002 | Morris | H04L 12/1818 709/204 |
| 6,519,574 B1 | 2/2003 | Wilton et al. | |
| 6,704,716 B1 | 3/2004 | Force | |
| 6,996,541 B2 * | 2/2006 | Togher | G06Q 30/08 705/35 |
| 7,024,387 B1 * | 4/2006 | Nieboer | G06Q 40/00 705/313 |
| 7,033,488 B2 * | 4/2006 | Rockwell | B01J 8/0035 208/152 |
| 7,035,819 B1 * | 4/2006 | Gianakouros | G06Q 20/10 705/37 |
| 7,136,834 B1 * | 11/2006 | Merrin | G06Q 40/00 705/37 |
| 7,599,867 B1 * | 10/2009 | Monroe | G06Q 20/10 382/181 |
| 7,890,417 B2 * | 2/2011 | Hanson | G06Q 20/10 705/36 R |
| 8,266,045 B2 * | 9/2012 | Waelbroeck | G06Q 30/08 705/35 |
| 2001/0047332 A1 | 11/2001 | Gonen-Friedman et al. | |
| 2001/0051909 A1 | 12/2001 | Keith | |
| 2002/0005827 A1 | 1/2002 | Kobayashi | |
| 2002/0007337 A1 | 1/2002 | Schade et al. | |
| 2002/0010672 A1 | 1/2002 | Waelbroeck et al. | |
| 2002/0016976 A1 | 2/2002 | Shokat | |
| 2002/0052825 A1 | 5/2002 | Bensemana | |
| 2002/0055901 A1 | 5/2002 | Gianakouros et al. | |
| 2002/0169706 A1 | 11/2002 | Chandra et al. | |
| 2003/0004859 A1 | 1/2003 | Shaw et al. | |
| 2003/0046217 A1 | 3/2003 | Deaderick et al. | |
| 2003/0061069 A1 | 3/2003 | Silverman et al. | |
| 2003/0088499 A1 | 5/2003 | Gilbert et al. | |
| 2003/0120585 A1 | 6/2003 | Rosenblatt | |
| 2003/0204467 A1 | 10/2003 | Kartha et al. | |
| 2004/0034591 A1 | 2/2004 | Waelbroeck et al. | |
| 2004/0059666 A1 | 3/2004 | Waelbroeck et al. | |
| 2004/0153392 A1 | 8/2004 | West et al. | |
| 2004/0153394 A1 | 8/2004 | West et al. | |
| 2004/0177025 A1 | 9/2004 | Spoonhower et al. | |
| 2004/0193525 A1 | 9/2004 | Huang | |
| 2004/0210511 A1 | 10/2004 | Waelbroeck et al. | |
| 2004/0254875 A1 | 12/2004 | Byde et al. | |
| 2005/0108125 A1 | 5/2005 | Goodwin et al. | |
| 2005/0187858 A1 | 8/2005 | Graham et al. | |
| 2005/0228735 A1 * | 10/2005 | Duquette | G06Q 40/04 705/37 |
| 2005/0246261 A1 | 11/2005 | Stevens et al. | |
| 2005/0283426 A1 | 12/2005 | Krishnasami et al. | |
| 2005/0289039 A1 | 12/2005 | Greak | |
| 2006/0047598 A1 | 3/2006 | Hansen | |
| 2006/0059082 A1 | 3/2006 | Silverman et al. | |
| 2006/0224587 A1 | 10/2006 | Zamir et al. | |
| 2007/0055607 A1 | 3/2007 | Wunsch et al. | |
| 2009/0006266 A1 * | 1/2009 | Hanson | G06Q 20/10 705/80 |
| 2009/0186689 A1 * | 7/2009 | Hughes | G06Q 30/0216 463/25 |
| 2011/0119176 A1 * | 5/2011 | Hanson | G06Q 20/10 705/37 |
| 2013/0185187 A1 * | 7/2013 | Vasinkevich | G06Q 40/04 705/37 |
| 2014/0081823 A1 * | 3/2014 | Phadnis | G06Q 40/04 705/37 |
| 2015/0149351 A1 * | 5/2015 | Kagiwada | G06Q 20/10 705/40 |

FOREIGN PATENT DOCUMENTS

| | | |
|---|---|---|
| CA | 2377481 A1 | 1/2001 |
| CA | 2381174 A1 | 2/2001 |
| CA | 2386121 A1 | 4/2001 |
| CA | 2389828 A1 | 5/2001 |
| CA | 2383113 A1 | 12/2001 |
| CA | 2477742 A1 | 9/2003 |
| CA | 2394967 A1 | 12/2003 |
| CA | 2504600 A1 | 5/2004 |
| CA | 2530714 A1 | 2/2005 |
| EP | 0399850 A1 | 11/1990 |
| EP | 0407026 A2 | 1/1991 |
| EP | 0416482 A2 | 3/1991 |
| EP | 0434224 A2 | 6/1991 |
| EP | 0491455 A2 | 6/1992 |
| GB | 2294788 A | 5/1996 |
| JP | 5-314139 A | 11/1993 |
| JP | 2000-172761 A | 6/2000 |
| WO | WO 1997/22072 A1 | 6/1997 |
| WO | WO 2002/095638 A2 | 11/2002 |

* cited by examiner

SYSTEM AND METHODS FOR OPTIMIZING THE EFFECTIVENESS OF INTERACTION BETWEEN PARTICIPANTS IN AN ELECTRONIC TRADING ENVIRONMENT

CROSS-REFERENCE TO RELATED APPLICATIONS

This application claims priority to and benefit from U.S. Provisional Patent Application No. 61/831,541 titled "System and Methods for Optimizing the Effectiveness of Interaction Between Participants in an Electronic Trading Environment" filed on Jun. 5, 2013, which is incorporated herein by reference for all purposes.

BACKGROUND

An electronic trading system enables trading of financial instruments such as securities, derivatives and foreign exchange instruments. Traders submit orders to buy or sell a quantity of a financial instrument to the electronic trading system. The electronic trading system in turn typically uses order matching algorithms to execute trades based on the orders. Following execution of the trades, a clearing and settlement process exchanges the seller's financial instruments for the buyer's cash.

DETAILED DESCRIPTION

System and methods for optimizing the effectiveness of the interaction between participants in an electronic trading environment are disclosed. In one embodiment, the disclosed system and methods use scorecards and filters to optimize the effectiveness of the interaction between participants. Scorecards can identify potential counterparties based on one or more factors including the counterparties' past behavior in one or more areas. In one embodiment, the system calculates and maintains a scorecard for each trader by recording the trading behavior of the trader in different areas. In one embodiment, while traders may not see their counterparty's scores, or may see only score ranges, the traders can configure and/or use filters to filter out counterparties with undesirable behavior, and select counterparties with desirable behavior for trading, thereby facilitating the traders to have control over their trades by letting them decide to whom they want to disclose information. In one implementation, traders can customize different filter templates (e.g., Normal, Conservative, and Aggressive) by indicating a required score for each of the categories.

Various embodiments of the system and methods for optimizing interaction between participants in an electronic trading system will now be described. The following description provides specific details for a thorough understanding and an enabling description of these embodiments. One skilled in the art will understand, however, that the embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Figure 1:
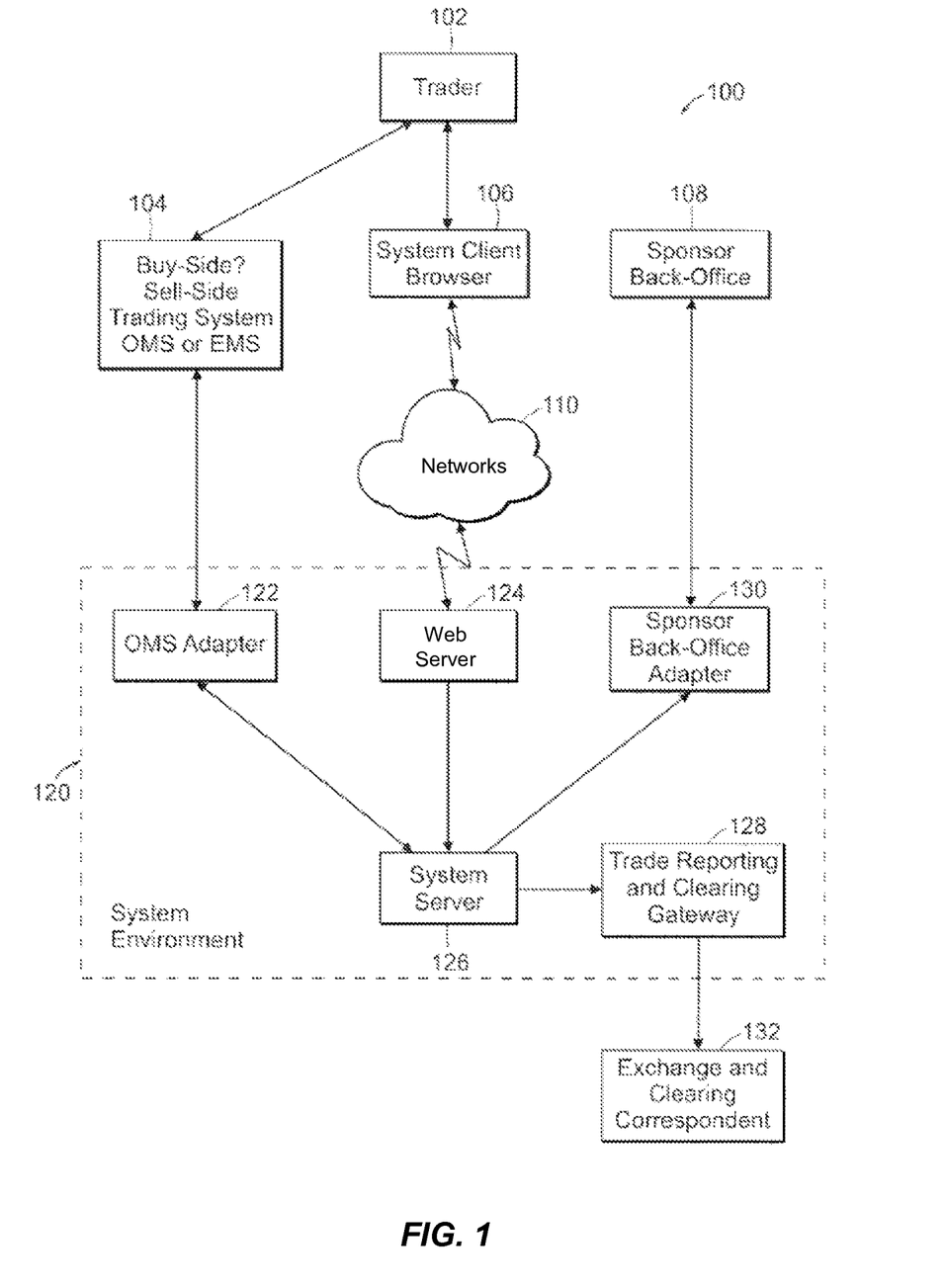
FIG. 1 depicts an example block diagram of an electronic trading environment including a system for optimizing the effectiveness of interaction between participants.

FIG. 1 depicts an example block diagram of an electronic block trading environment implementing a system for optimizing the effectiveness of interaction between participants. In one embodiment, a trader 102, whether a buy side trader or a sell side trader, enters one or more orders into the system environment 120. In one implementation, the trader 102 can enter orders using a browser 106 on a client or terminal device such as a desktop computer, a laptop computer, a work station, a mobile device, a tablet, and the like, that is connected via a network 110 to a web server 124. The network 110 can include a wireless, wired or any other type of network. The communication between the client or terminal device and the web server 124 via the network 110 is secured, and/or encrypted. In another implementation, the trader 102 can enter orders via a buy-side/sell-side trading system order management system ("OMS") or execution management system ("EMS") 104. The OMS or EMS 104 is connected to the OMS adapter 122 directly or via network 110. The OMS adapter is used to communicate or translate transactions and responses between traders in the system environment 120. In one embodiment, the trader 102 can be a human trader or a computer algorithm.

In one embodiment, orders that are transmitted to the system environment 120 by the trader 102 via the OMS/EMS 104 or the web browser 106 are sent to trading system server 126 for processing the order according to the rules of the system. When trades are effected, information about the trades, besides being sent to the counterparties to the transaction, is forwarded to the trade reporting and clearing gateway 128 and sponsor backoffice adapter 130. The trade reporting and clearing gateway 128 transmits trade reports to the Exchange and clearing files to the Clearing Correspondent. The exchange and clearing correspondent 132 reports the trades out to the market and the Clearing Correspondent clears and settles the trades. Sponsor back-office adapter 130 transmits trade and order information to sponsor back-office 108 for record keeping. This information may include, but is not limited to, trade and order details.

Figure 2:
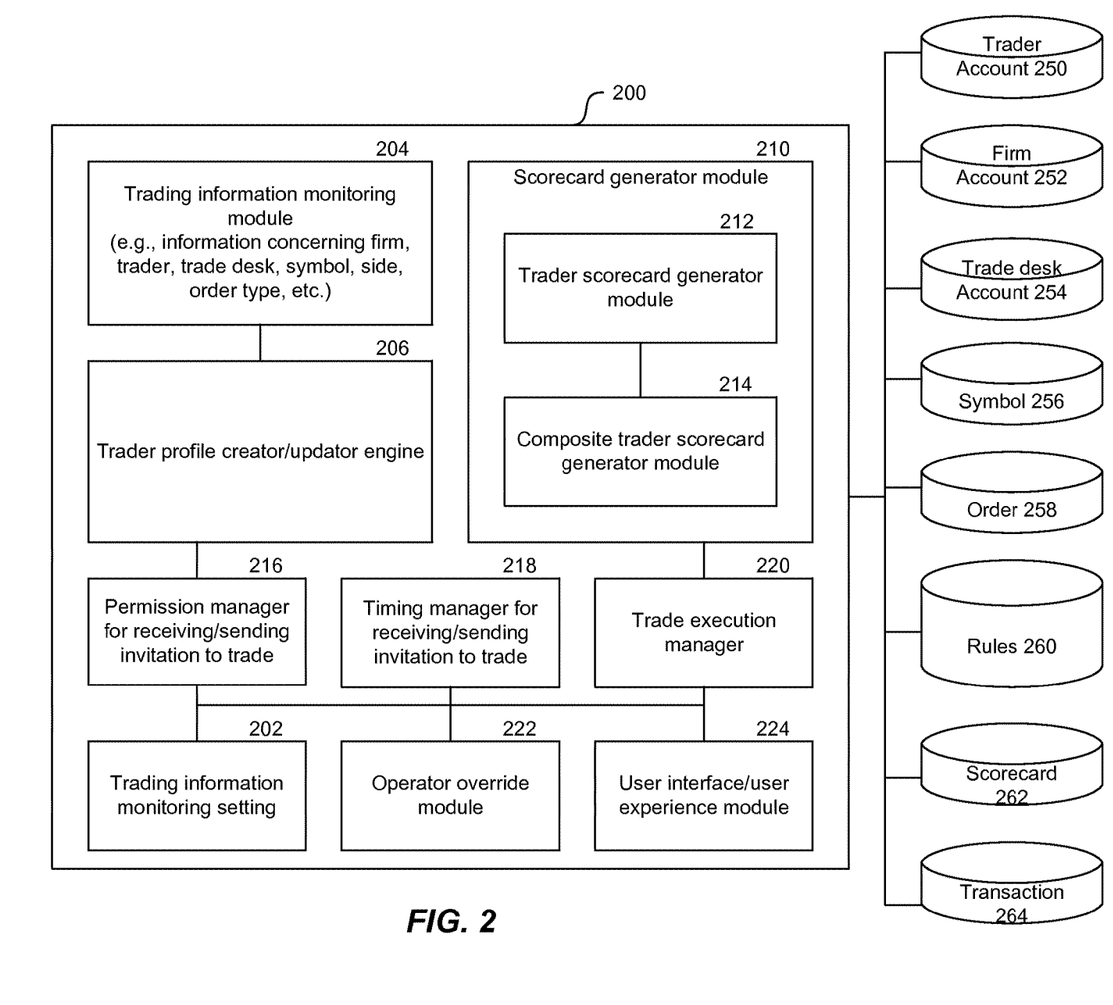
FIG. 2 depicts an example block diagram of a system for optimizing the effectiveness of interaction between participants.

FIG. 2 depicts an example block diagram of a system 200 for optimizing the effectiveness of interaction between participants. In one embodiment, the system 200 monitors and tracks certain variables at several levels (e.g., firm, trader, trade desk, symbol, side, order type, and the like) for each participant in the system. The system 200 further updates values associated with the tracked variables in real time, and/or over longer periods of time. From the values of these variables, the system 200 assigns individual and/or composite scores to each trader, symbol or side or any composite of these and other variables. For every interaction in the trading environment, the individual and/or composite scores and variables can be used to determine how a trader interacts with a contra trader when their respective scores are compared.

The system 200 may include several components, engines, and/or modules. As used herein, a "module," "a manager," or an "engine" includes a general purpose, dedicated or shared processor and, typically, firmware or software modules that are executed by the processor. Depending upon implementation-specific or other considerations, the module, manager, or engine can be centralized or its functionality distributed. The module, manager, hander, or engine can include general or special purpose hardware, firmware, or software embodied in a computer-readable (storage) medium for execution by the processor.

In one embodiment, the system 200 can include a trading information monitoring setting module 202, a trading information monitoring module 204, a trader profile creator/updator engine 206, a scorecard generator module 210 having a trader scorecard generator module 212 and a composite trader scorecard generator module 214, a permission manager for receiving/sending invitation to trade 216, a timing manager for receiving/sending invitation to trade 218, a trade execution manager 220, a user interface/user experience module 224 and an operator override module 222. One or more of these modules may be consolidated into a single module, or further sub-divided into multiple modules in some implementations.

The trading information monitoring setting module 202, in one embodiment, can be used to define, select or specify one or more variables for monitoring by the trading information monitoring module 204. These variables are related to trader behavior, order type and size information, and the like in some implementations. Monitoring, tracking and analyzing of one or more of the variables can provide an insight into trader behavior, in real time, over a period of time, and changes or trends in trader behavior, for example. Table 1 below provides an example listing of variables that may be selected for monitoring by the trading information monitoring module 204.

TABLE 1

1. The duration for which the trader leaves an open order on the book
2. The price relative to the national best bid and offer (NBBO)
3. The price protection conditions of the order (e.g. midpoint peg)
4. The frequency with which the trader responds to an invitation positively (i.e. in a manner that will more likely lead to a trade)
5. The frequency with which the trader response to an invitation results in an actual trade
6. The trader's order size relative to size of the contra trader's order size
7. The trader's order size relative to size of the contra trader's minimum trade volume
8. The trader's firm-up order size relative to the size of that trader's indicated size on its conditional order
9. The frequency with which the trader replenishes (cancel/replaces) an order
10. The speed at which the trader firms up when invited
11. The behavior of the trader on previous invitations that day in general and for that symbol in particular
12. Whether the trader is a human or a computer algorithm
13. Whether the order is an agency order or a proprietary order
14. Whether the order is manually firmed up by the trader or uses automatic firm-up
15. The size of the order relative to the average daily volume (ADV) of that symbol
16. The current volatility of the symbol
17. The implied volatility of the symbol
18. When a potential invitation occurs, whether or not this involves a newly entered order that is the first for that symbol by that trader
19. Whether the trader is a new trader who has never used the system before
20. The time of day
21. Which level of filtering has been selected by the trader on a sliding scale from very conservative (only very high quality interaction is desired) to very aggressive (interact with as much contra order flow as possible)
22. Whether an order is about to expire The trading information monitoring module 204 monitors and tracks selected variables at several levels (e.g., firm, trader, trade desk, symbol, side, order type, and the like) for each participant in the system. The trading information monitoring module 204 captures values corresponding to the monitored variables and stores the values for each trader in a datastore. The trading information monitoring module 204 can further update values associated with the variables in real time and/or over longer periods in one implementation. In one implementation, the trading information monitoring module 204 monitors the variables universally (i.e. for all orders), and/or for orders matching certain criteria. In a further implementation, the trading information monitoring module 204 monitors the variables for specific symbols.

The trader profile creator/updator engine 206, in one embodiment, creates a profile for each trader using information from one or more variables captured and stored by the system, and/or other information derived from the analysis of the captured data. The trader profile is updated and/or supplemented over time as more information is available from the monitoring, and/or other sources (e.g. from the scorecard generator module 210).

The scorecard generator module 210 having a trader scorecard generator module 212 and a composite trader scorecard generator module 214, in one embodiment, may perform scorecard calculations to generate a score based on information concerning one or more monitored variables. The scorecard calculation can be on a trader basis, symbol basis, on the basis of trading desk transactions, and the like. The score can be a statistical score, generated using statistical methods such as averages, medians and/or more complex statistical methods. In a further implementation, the score can be generated as a weighted sum, average or other formula that assigns more weight or importance to certain variables and less weight or importance to others.

The trader scorecard generator 212 generates a score for each trader across all orders based on trader behavior information and/or other information obtained from the monitoring of the variables. In a further implementation, the individual trader scorecard can be calculated for orders matching certain criteria (e.g., time criteria, order type criteria, and the like). The composite trader scorecard generator module 214 can generate a composite score for trader per symbol, a composite score for trader per symbol per side, and the like. The scorecards generated by the scorecard generator module 210 can be stored in association with the trader profile. In one implementation, the scorecard can be recalculated or updated as new information is available from the monitoring module 204.

For every interaction in the trading system, the individual trader scores/composite trader scores and variables can be used to determine how a trader interacts with a contra trader when their respective scores are compared. The interactions affected can include (a) permissioning and timing of sending invitations to trade, (b) permissioning and timing of receiving invitations to trade and (c) trade execution itself. In one embodiment, the rules for triggering these interactions are configured via the modules 216-220 respectively.

For example, the permission manager for receiving/sending invitation to trade 216 can allow configuration of conditions and rules for sending or receiving of an invitation to change conditional order (e.g., an order in which volume has not been committed) to a Firm order (e.g., an order in which volume has been committed) so that the order can be traded. In one implementation, the manager can also allow configuration of conditions and rules for sending or receiving of an invitation for opening a negotiation when an order does not cross another order but is within the price and volume ranges of the other order. By way of example only, the permission manager 216 can be configured to allow sending of an invitation for an order from a trader having a trader score above a predefined threshold. By way of another example, the invitation can be permitted to be sent when the trader score for a symbol associated with the order is within a predefined range. Various other rules and conditions and combination of rules and conditions, based on the individual and/or composite trader scores and/or variables are within the scope of the disclosure. In one implementation, the permission manager can act as a filter to permit invitations to be sent when the trader and contra trader scores meet certain rules and/or conditions, and forbid invitations when such rules and/or conditions are not met.

The timing manager for receiving/sending invitation to trade 218 can be configured to determine the timing of sending of the invitation to change a conditional order to a Firm order or an invitation to open a negotiation, based on the individual and/or composite trader scores, and/or variables. In one implementation, the timing manager 218 can accelerate or delay the receiving/sending of the invitations, based on the individual/composite trader scores and/or variables.

The trade execution manager 220 determines whether a trade execution can occur between a trader and a contra trader, based on the individual/composite trader scores and/or variables. In a further implementation, the trade execution manager 220 can also determine the timing of the execution of the trade.

The operator override module 222 allows human operators to intervene and over-ride the system-generated scores and settings in some embodiments. The override can occur, for example, if it is believed to be in the best interests of participants.

The user interface/user experience module 224 may generate and/or provide user interface/user experience for configuring one or more of the modules 202-222 described above.

In one embodiment, the system 200 may be coupled to one or more database tables or datastores such as a trader account table 250 (e.g., trader ID, trader score, trader type, and the like), a firm account table 252 (e.g., firm ID, firm name, max order value, daily maximum on sells, etc.), a trade desk account table 254 (e.g., desk ID, desk name, firm ID, desk type, desk state, and the like), a symbol table 256 (e.g., symbol, firm ID, allow short sell, current volatility, implied volatility, and the like), an order table 258 (e.g., order ID, order type, entry date/time, price, order size, and the like), a rules table 260 (e.g., rule ID, condition, outcome, and the like), a scorecard table 262 (e.g., trader ID, score value, number of transactions, date range, and the like), a transaction table 264 (e.g., transaction ID, order ID, trader ID, symbol ID, and the like) and/or the like. In one implementation, the values corresponding to the monitored variables may be stored in one or more the tables 250-262 or in a separate data store. In a further implementation, the way in which a variable is stored and how it is used in the calculation of each score may differ from one variable to another.

Figure 3:
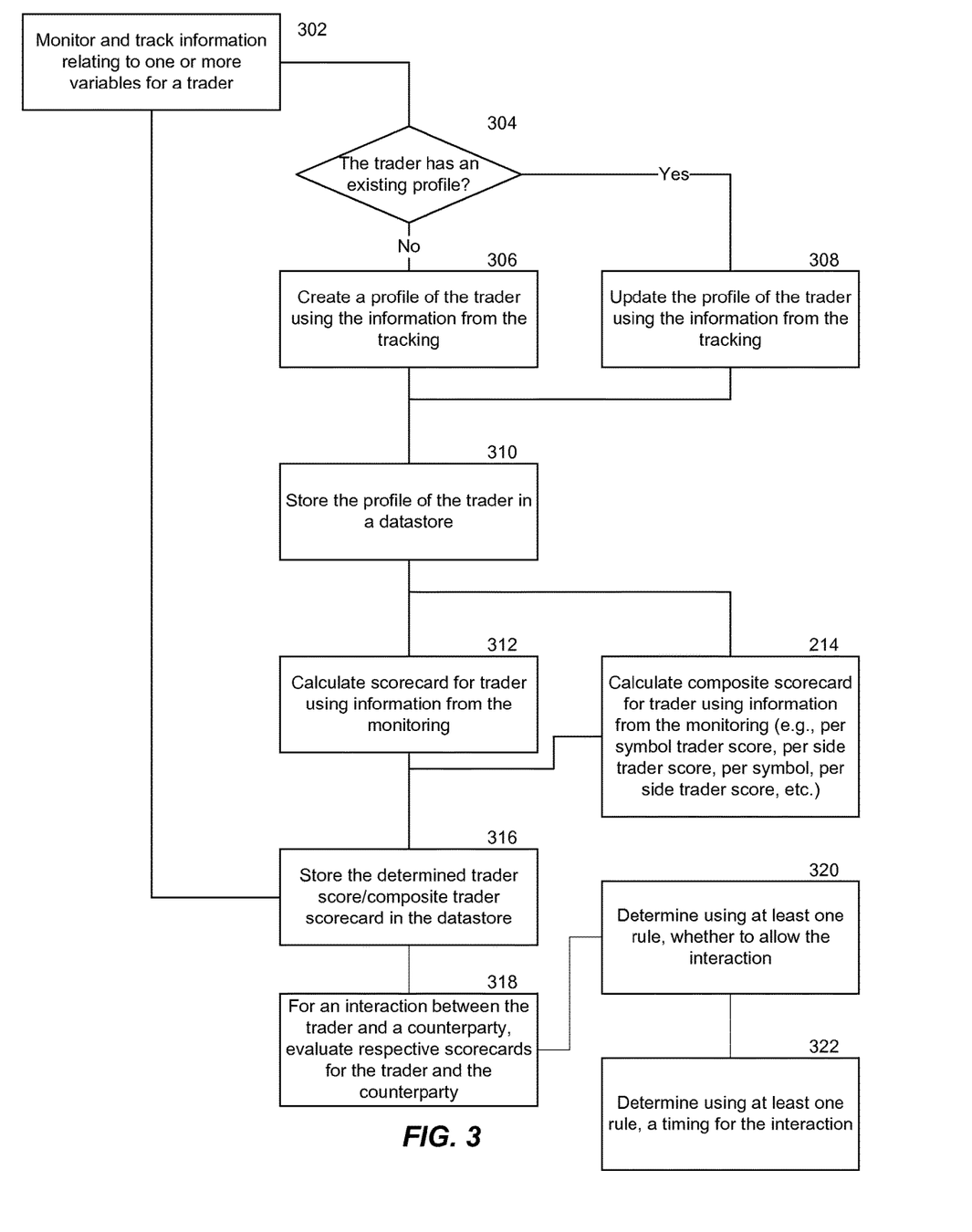
FIG. 3 depicts a logic flow diagram illustrating an example method for optimizing the effectiveness of interaction between participants.

FIG. 3 depicts a logic flow diagram illustrating an example method 300 for optimizing the effectiveness of interaction between participants.

At block 302, the system monitors and tracks information relating to one or more variables for each trader. The monitoring and tracking may be at a firm level, trader level, trade desk level, symbol level, side level, order type level, and the like. The captured information are stored by the system for each trader to create and/or update a profile of that trader over time. At decision block 304, the system determines if a trader has an existing profile. If the trader has no existing profile, the system creates one for the trader, and associates the captured information for the trader to the trader's profile at block 306. If the trader has an existing profile, the existing profile is updated or supplemented using the captured information at block 308. The created or updated profile of the trader is stored in a datastore at block 310. At block 312, the system calculates a scorecard for the trader using the captured information corresponding to one or more of the monitored variables. As described above, the scorecard may be calculated using statistical methods. At block 314, the system calculates a composite scorecard, using the captured information corresponding to certain monitored variables. For example, a per symbol composite scorecard for the trader may be calculated. At block 316, the calculated scorecard is stored in the datastore in association with the user profile. The system then continues the process of monitoring and tracking of the variables at block 302.

At block 318, for every interaction between a trader and a counterparty, the trading system evaluates the respective scorecards for the trader and the counterpart. In one implementation, the system uses the calculated scorecards and variables to determine how a trader interacts with a contra trader when their respective scores are compared, including determining the permissioning and timing of certain types of interactions. At block 320, the system determines, using at least one rule, whether to allow the interaction or a type of interaction to allow with the contra trader. For example, in one implementation, the system determines the permissioning of receiving or sending invitations to trade. At block 322, the system, based using at least one rule, determines a timing for the interaction. For example, in one implementation, the system determines the timing of receiving or sending invitations to trade. In a further implementation, the system can determine permissioning and timing of actual execution of the trade itself. Using the calculated scorecards that can take into account the trader and contra trader's past behavior or behavioral pattern, trading context (e.g., pricing, order type, etc.), price protection conditions or other preferences, and the like, trader and contra trader interaction can be made more effective, such that an actual trade is more likely to occur between the participants.

Figure 4:
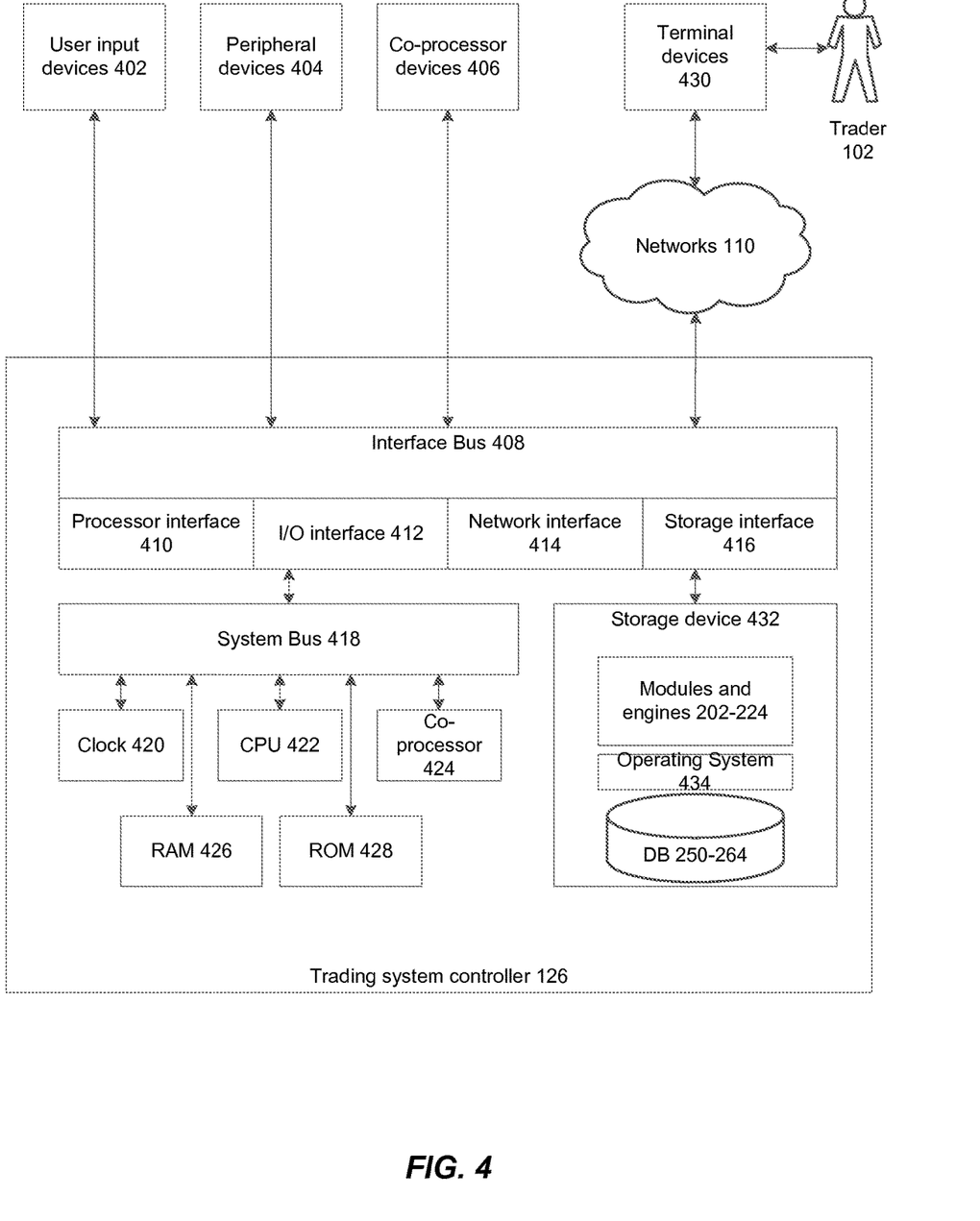
FIG. 4 depicts a block diagram of an example machine implementing system for optimizing the effectiveness of interaction between participants.

FIG. 4 depicts a block diagram of an example machine implementing the system for optimizing the effectiveness of interaction between participants.

Aspects and implementations of the system of the disclosure have been described in the general context of computer-executable instructions, such as routines executed by a general-purpose computer, a personal computer, a server, and/or other computing systems such as the trading system server 126. The trading system server 126 may be in communication with entities including one or more users (e.g., trader 102), client/terminal devices 430, user input devices 402, peripheral devices 404, an optional co-processor device(s) (e.g., cryptographic processor devices) 406, and networks 110. Users can engage with the trading system server 126 via client devices 430 over networks 110.

Computers employ central processing unit (CPU) or processor (hereinafter "processor") to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The trading system server may include clock 420, CPU 422, memory such as read only memory (ROM) 428 and random access memory (RAM) 426 and co-processor 424 among others. These controller components may be connected to a system bus 418, and through the system bus 418 to an interface bus 408. Further, user input devices 402, peripheral devices 404, co-processor devices 406, and the like, may be connected through the interface bus 408 to the system bus 418. The Interface bus 408 may be connected to a number of interface adapters such as processor interface 410, input output interfaces (I/O) 412, network interfaces 414, storage interfaces 416, and the like.

Processor interface 410 may facilitate communication between co-processor devices 406 and co-processor 424. In one implementation, processor interface 410 may expedite encryption and decryption of requests or data. Input Output interfaces (I/O) 412 facilitate communication between user input devices 402, peripheral devices 404, co-processor devices 406, and/or the like and components of the trading system server 126 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 414 may be in communication with the network. Through the network, the trading system server may be accessible to remote client devices 120. Network interfaces 414 may use various wired and wireless connection protocols such as, direct connect, Ethernet, wireless connection such as IEEE 802.11a-x, and the like. Examples of network 125 include the Internet, Local Area Network (LAN), Metropolitan Area Network (MAN), a Wide Area Network (WAN), wireless network (e.g., using Wireless Application Protocol WAP), a secured custom connection, and the like. The network interfaces 414 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 416 may be in communication with a number of storage devices such as, storage devices 432, removable disc devices, and the like. The storage interfaces 416 may use various connection protocols such as Serial Advanced Technology Attachment (SATA), IEEE 1394, Ethernet, Universal Serial Bus (USB), and the like.

User input devices 402 and peripheral devices 404 may be connected to I/O interface 412 and potentially other interfaces, buses and/or components. User input devices 402 may include card readers, finger print readers, joysticks, keyboards, microphones, mouse, remote controls, retina readers, touch screens, sensors, and/or the like. Peripheral devices 404 may include antenna, audio devices (e.g., microphone, speakers, etc.), cameras, external processors, communication devices, radio frequency identifiers (RFIDs), scanners, printers, storage devices, transceivers, and/or the like. Co-processor devices 406 may be connected to the trading system server 126 through interface bus 408, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The trading system server 126 may employ various forms of memory including on-chip CPU memory (e.g., registers), RAM 426, ROM 428, and storage devices 432. Storage devices 432 may employ any number of tangible, non-transitory storage devices or systems such as fixed or removable magnetic disk drive, an optical drive, solid state memory devices and other processor-readable storage media. Computer-executable instructions stored in the memory may include the system 200 having one or more program modules such as routines, programs, objects, components, data structures, and so on that perform particular tasks or implement particular abstract data types. For example, the memory may contain operating system (OS) component 434, program modules and other components (e.g., 202-224), database tables 250-264, and the like. These modules/components may be stored and accessed from the storage devices, including from external storage devices accessible through an interface bus.

The database components 250-264 are stored programs executed by the processor to process the stored data. The database components may be implemented in the form of a database that is relational, scalable and secure. Examples of such database include DB2®, MySQL®, Oracle®, Sybase®, and the like. Alternatively, the database may be implemented using various standard data-structures, such as an array, hash, list, struct, structured text file (e.g., XML), table, and/or the like. Such data-structures may be stored in memory and/or in structured files.

The trading system server 126 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the trading system server 126 may be distributed electronically over the Internet or over other networks (including wireless networks). Those skilled in the relevant art will recognize that portions of the system 200 may reside on a server computer, while corresponding portions reside on a client computer. Data structures and transmission of data particular to aspects of the trading system server 126 are also encompassed within the scope of the embodiments.

The above Detailed Description of embodiments of the disclosure is not intended to be exhaustive or to limit the disclosed system and methods to the precise form disclosed above. While specific examples for the embodiments are described above for illustrative purposes, various equivalent modifications are possible within the scope of the embodiments, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative combinations or subcombinations. Each of these processes or blocks may be implemented in a variety of different ways. Also, while processes or blocks are at times shown as being performed in series, these processes or blocks may instead be performed or implemented in parallel, or may be performed at different times. In general, the terms used in the following claims should not be construed to limit the disclosure to the specific examples disclosed in the specification, unless the above Detailed Description section explicitly defines such terms. Accordingly, the actual scope of the disclosure encompasses not only the disclosed examples, but also all equivalent ways of practicing or implementing the disclosure under the claims.

From the foregoing, it will be appreciated that specific embodiments of the disclosure have been described herein for purposes of illustration, but that various modifications may be made without deviating from the spirit and scope of the disclosure. Accordingly, the disclosure is not limited.

We claim:

1. A processor-implemented method for optimizing the effectiveness of interaction between multiple, anonymous, geographically-distributed traders participating in trades administered via an online trading system, comprising:
    monitoring multiple trading variables for the multiple traders in the trading system;
    receiving, by a processor, an invitation to trade from a counter party to a first trader,
        wherein the first trader and the counter party are included among the multiple traders;
    analyzing, on a day of a trade:
        (i) the invitation from the counter party to the first trader, and
        (ii) the multiple trading variables for the first trader and the counter party monitored in the online trading system,
    wherein the multiple trading variables include:
        a firm-up speed variable for the first trader or the counter party indicating a speed of the first trader or the counter party in firming up to an invitation to trade,
        a firm-up type variable associated with a trade that represents whether the trade is subjected to manual firm-up or automatic firm-up, and
        a symbol-specific behavior variable indicating a size of an order placed by the first trader or the counter party relative to an average daily volume (ADV) of the symbol associated with the order included in orders for trading financial instruments among the multiple traders in the trading system;
    based on the analysis, extracting a short-term behavior pattern of the first trader or the counter party;
    calculating, by the processor, a first score for the first trader and a second score for the counter party based on:
        (i) at least a portion of the multiple trading variables monitored for the first trader and the counter party and
        (ii) the short-term behavior pattern of the first trader or the counter party;
    determining, by the processor, a timing of sending the invitation from the counter party to the first trader based on the first score and the second score;
    sending, by the processor, the invitation to the first trader according to the determined timing; and
    in response to sending the invitation to the first trader, determining, on the day of the trade, a timing of execution of the trade between the first trader and the counter party based on the first score and the second score,
        wherein the timing of the execution of the trade between the first trader and the counter party is updated in real-time as the first score and the second score change with real-time changes in the multiple trading variables,
        wherein the first score and the second score are indicative of a likelihood that the trade will occur.

2. The method of claim 1, wherein the monitoring is performed in real time or near real time, wherein the first score or the second score is updated as new information is available.

3. The method of claim 1, wherein the monitoring is performed over a period of time.

4. The method of claim 1, wherein the multiple trading variables are monitored across all trades associated with the multiple traders.

5. The method of claim 1, wherein the first score or the second score is associated with a specific symbol in the trading system.

6. The method of claim 1, further comprising:
    creating profiles for the traders and
    storing the scores in association with the corresponding profiles.

7. The method of claim 1, wherein the multiple trading variables include a duration of order variable for which a trader among the multiple traders leaves an open order, wherein the order is included in one or more orders for trading financial instruments among the multiple traders in the trading system.

8. The method of claim 1, wherein the multiple trading variables include at least one of: a price relative to the national best bid and offer (NBBO) pricing or price protection conditions of an order included in one or more orders for trading financial instruments among the multiple traders in the trading system.

9. The method of claim 1, wherein the multiple trading variables include at least one of: a frequency variable for a trader among the multiple traders in the trading system indicating a total number of times when the trader positively responds to an invitation to trade, and a second frequency variable for indicating a total number of times when the trader response to an invitation to trade resulting in an actual trade, and a trader type variable indicating whether the trader is a human or an algorithm.

10. The method of claim 1, wherein the multiple trading variables include a symbol-specific behavior variable for the first trader or the counter party indicating a response behavior of the first trader or the counter party to a specific symbol associated with a trade.

11. The method of claim 1, wherein the multiple trading variables include a type of a trader among the multiple traders in the trading system, wherein the type of the trader defines whether the trader used the trading system in the past.

12. The method of claim 1, wherein the multiple trading variables include at least one of: a type of an order, a size of an order relative to an average daily volume for a symbol for the order, a current volatility of a symbol, or an implied volatility of a symbol, wherein the order is included in one or more orders for trading financial instruments among the multiple traders in the trading system.

13. The method of claim 1, wherein the multiple trading variables include a method of firming up an order, a time of the day of the trade, or a time remaining for an order to expire, wherein the order is included in one or more orders for trading financial instruments among the multiple traders in the trading system.

14. The method of claim 1, wherein the score for the first trader and the score for the counter party are generated using a statistical method or a weighted average method.

15. An online trading system that optimizes the effectiveness of interaction between multiple anonymous, geographically distributed traders participating in trades administered by the trading system, comprising:
a memory;
a processor in communication with the memory and configured to execute a plurality of instructions stored in the memory to:
monitor multiple trading variables for the multiple traders in a trading system over a period of time;
receive an invitation to trade from a counter party to a first trader, wherein the first trader and the counter party are included among the multiple traders;
analyze, on a day of the trade:
(i) the invitation from the counter party to the first trader, and
(ii) the multiple trading variables for the first trader and the counter party monitored in the online trading system,
wherein the multiple trading variables include:
a firm-up speed variable for the first trader or the counter party indicating a speed of the first trader or the counter party in firming up to an invitation to trade,
a firm-up type variable associated with a trade that represents whether the trade is subjected to manual firm-up or automatic firm-up, and
a symbol-specific behavior variable indicating a size of an order placed by the first trader or the counter party relative to an average daily volume (ADV) of the symbol associated with the order included in orders for trading financial instruments among the multiple traders in the trading system;
based on the analysis, extract a short-term behavior pattern of the first trader or the counter party;
calculate a first score for the first trader and a second score for the counter party based on:
(i) at least a portion of the multiple trading variables monitored for the first trader and the counter party and
(ii) the short-term behavior pattern of the first trader or the counter party;
determine a timing of sending the invitation from the counter party to the first trader based on the first score and the second score;
send the invitation to the first trader according to the determined timing; and
in response to sending the invitation to the first trader, determine, on the day of the trade, a timing of execution of the trade between the first trader and the counter party based on the first score and the second score,
wherein the timing of the execution of the trade between the first trader and the counter party is updated in real-time as the first score and the second score change with real-time changes in the multiple trading variables,
wherein the first score and the second score are indicative of a likelihood that the trade will occur.

16. The method of claim 1, wherein determining is based at least in part on application of a rule to the first score for the first trader and the second score for the counter party, wherein the rule specifies:
(i) that the first score for the first trader or the second score for the counter party is to exceed a threshold value, or
(ii) that the first score for the first trader or the second score for the counter party is to lie within a given range.

17. The method of claim 16, wherein the invitation to trade includes a first order, wherein the one rule further specifies allowing the invitation to trade to open a second order, wherein a price associated with the second order is within a price range of the first order, and wherein a volume associated with the second order is within a volume range of the first order.

18. The method of claim 1, wherein the multiple trading variables for the multiple traders indicate whether a trader is a buy-side trader or a sell-side trader, wherein the multiple traders in the trading system include a human trader or an electronic computer.

19. A non-transitory machine-readable medium having machine executable instructions stored thereon that, when executed by one or more processors, direct the one or more processors to perform a method comprising:
monitoring multiple trading variables for the multiple traders in a trading system;
receiving, by a processor, an invitation to trade from a counter party to a first trader,
wherein the first trader and the counter party are included among the multiple traders;
analyzing, on a day of a trade:
(i) the invitation from the counter party to the first trader, and
(ii) the multiple trading variables for the first trader and the counter party monitored in the online trading system,
wherein the multiple trading variables include:
a firm-up speed variable for the first trader or the counter party indicating a speed of the first trader or the counter party in firming up to an invitation to trade,
a firm-up type variable associated with a trade that represents whether the trade is subjected to manual firm-up or automatic firm-up, and
a symbol-specific behavior variable indicating a size of an order placed by the first trader or the counter party relative to an average daily volume (ADV) of the symbol associated with the order included in orders for trading financial instruments among the multiple traders in the trading system;
based on the analysis, extracting a short-term behavior pattern of the first trader or the counter party;
calculating, by the processor, a first score for the first trader and a second score for the counter party based on:
(i) at least a portion of the multiple trading variables monitored for the first trader and the counter party and
(ii) the short-term behavior pattern of the first trader or the counter party;

determining, by the processor, a timing of sending the invitation from the counter party to the first trader based on the first score and the second score;

sending, by the processor, the invitation to the first trader according to the determined timing; and in response to sending the invitation to the first trader, determining, on the day of the trade, a timing of execution of the trade between the first trader and the counter party based on the first score and the second score, wherein the timing of the execution of the trade between the first trader and the counter party is updated in real-time as the first score and the second score change with real-time changes in the multiple trading variables, wherein the first score and the second score are indicative of a likelihood that the trade will occur.

* * * * *